April 22, 1941. G. W. COCKS 2,239,483
RECEIVING AND SUPPORTING RECEPTACLE FOR BULK ICE CREAM DISTORTABLE CARTONS
Filed Feb. 20, 1940 3 Sheets-Sheet 1
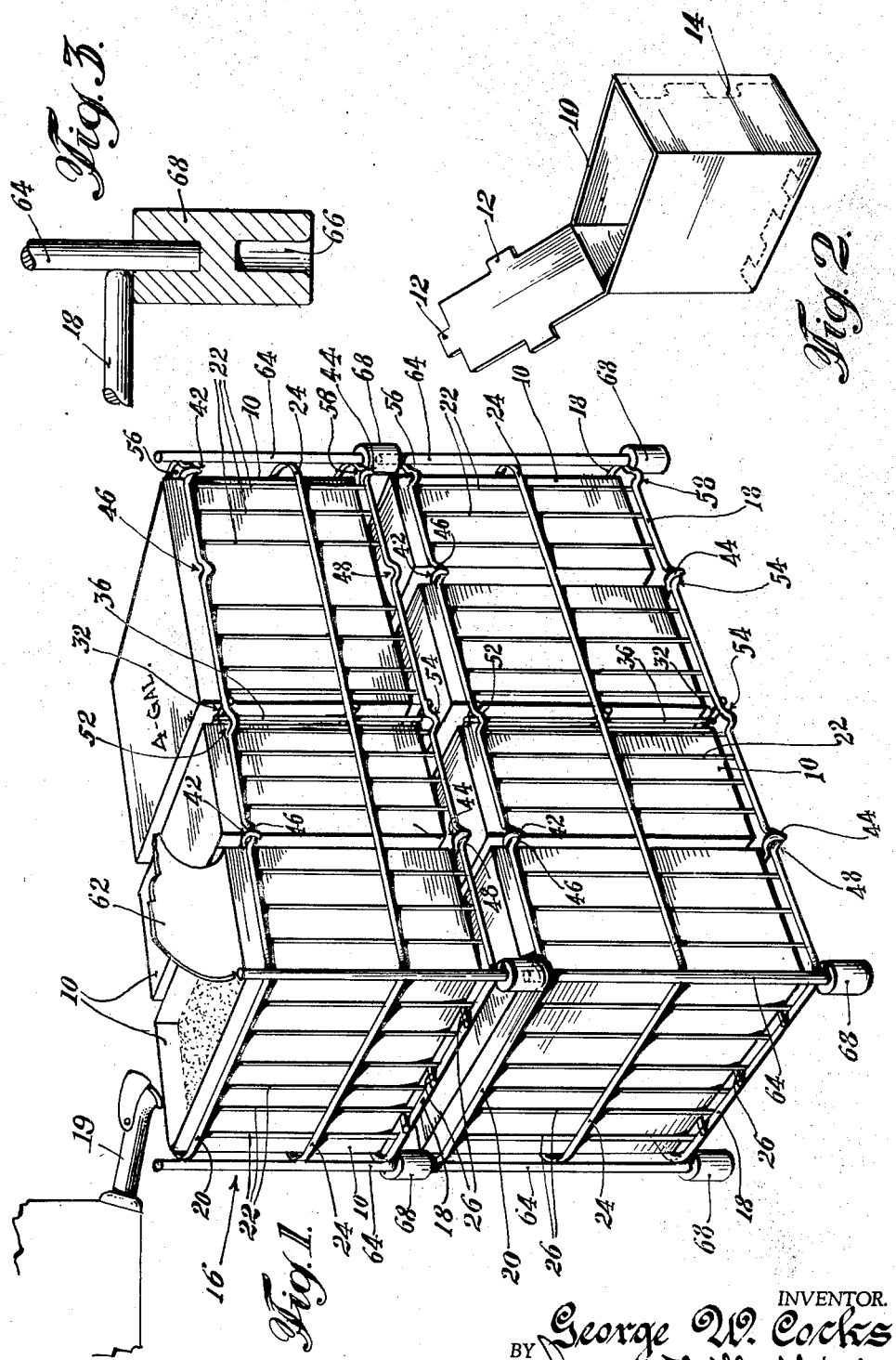
INVENTOR.
George W. Cocks
BY Irving F. Goodfriend
ATTORNEY.

April 22, 1941.                    G. W. COCKS                    2,239,483
RECEIVING AND SUPPORTING RECEPTACLE FOR BULK ICE CREAM DISTORTABLE CARTONS
                    Filed Feb. 20, 1940              3 Sheets-Sheet 2
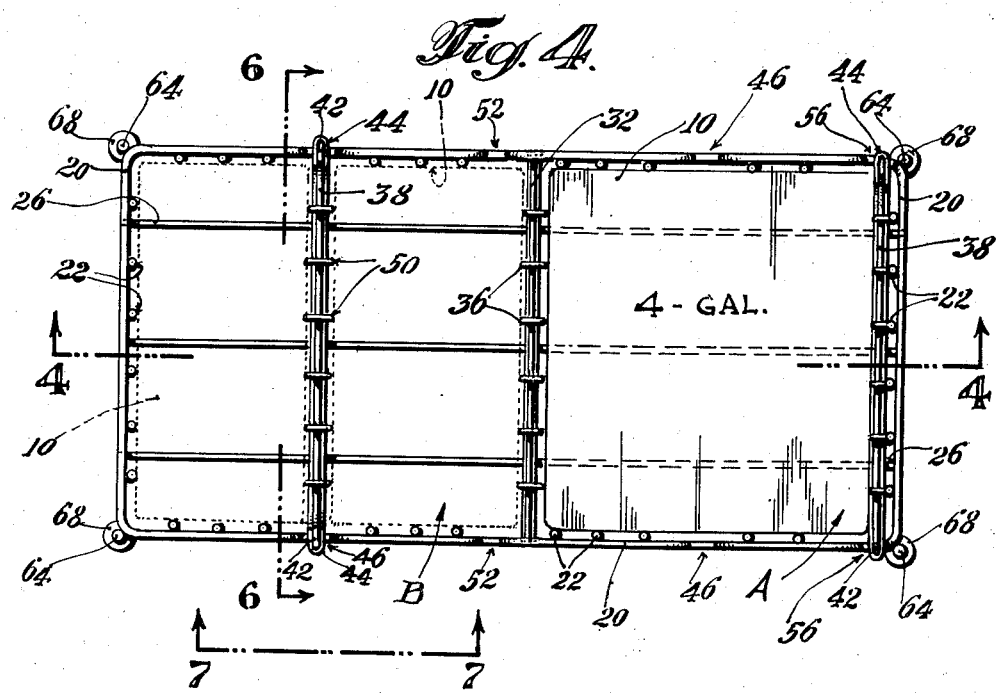
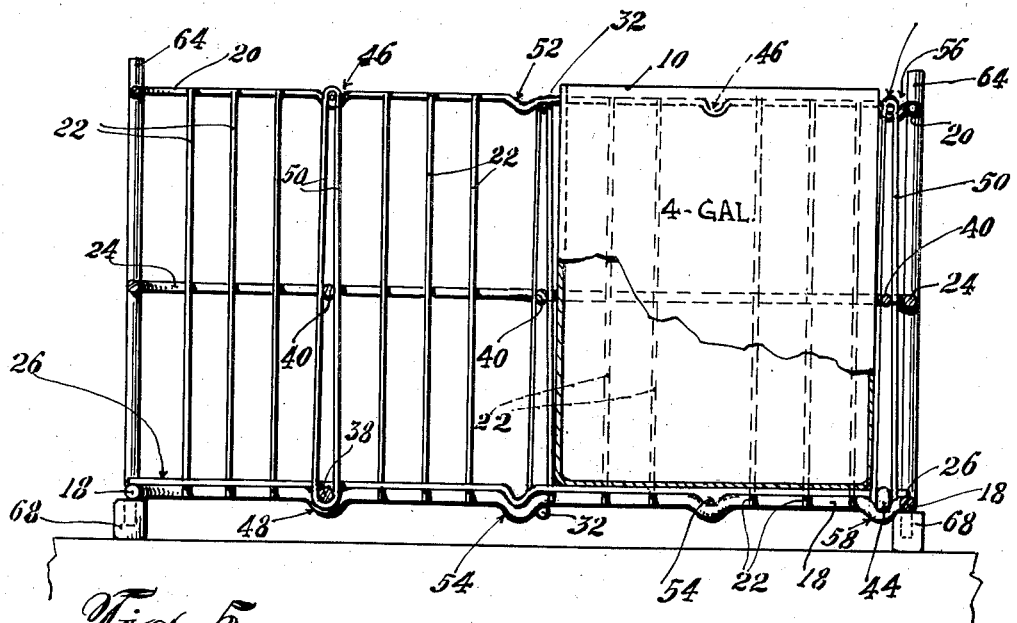
INVENTOR.
George W. Cocks
BY Irving F. Goodfriend
ATTORNEY.

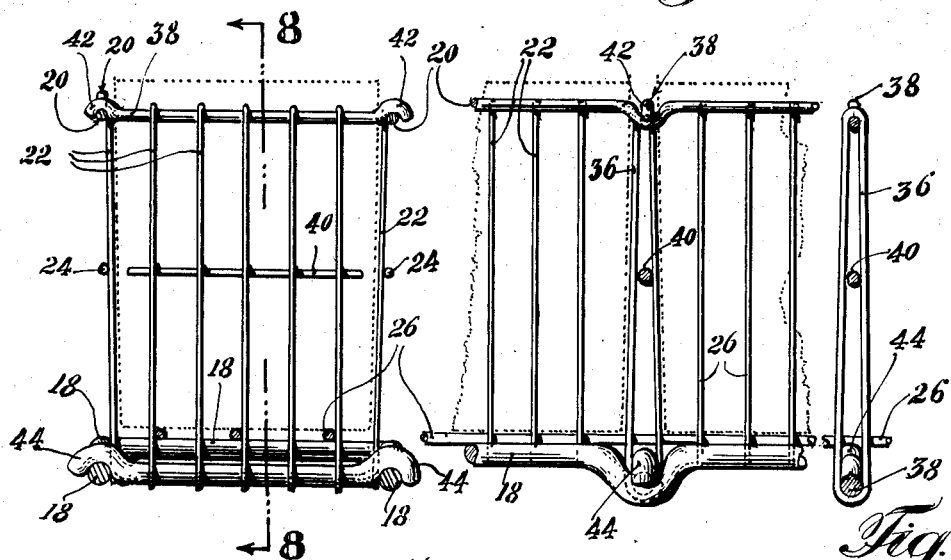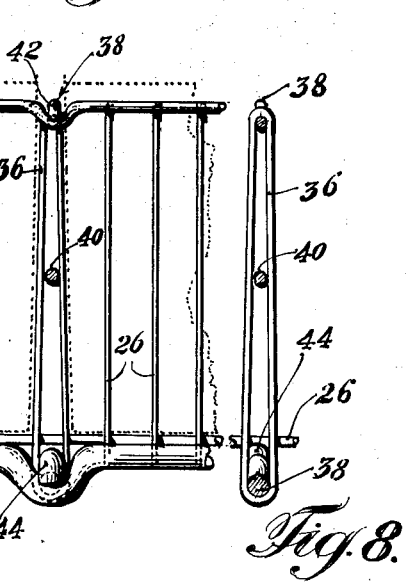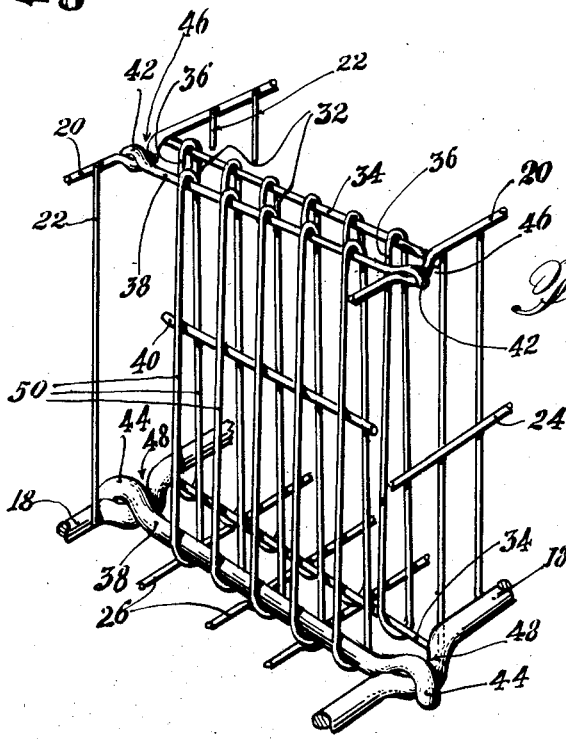

Patented Apr. 22, 1941

2,239,483

UNITED STATES PATENT OFFICE 2,239,483

RECEIVING AND SUPPORTING RECEPTACLE FOR BULK ICE CREAM DISTORTABLE CARTONS

George W. Cocks, Upper Montclair, N. J., assignor to Marathon Paper Mills Company, Rothschild, Wis., a corporation of Wisconsin Application February 20, 1940, Serial No. 319,823

16 Claims. (Cl. 62—114)

This invention relates to a receptacle to be used for receiving and supporting therein against destruction, distortion and collapse a relatively non-rigid and distortable carton, subjected to the process of being filled with a semi-liquid comestible such as, for example, semi-frozen ice cream, and the process of freezing and congealing such comestible in the carton.

I have described in Patent No. 2,109,102, issued to me February 22, 1938, a Method for packaging bulk ice cream and similar freezable comestibles in cartons of comparatively large predetermined size and contour such that the ice cream and the like dispensing storage capacity of the conventional dispensing refrigerated cabinet is greatly increased over the present dispensing storage capacity of such cabinet.

In my co-pending application Serial No. 319,-822 for patent for a Method of packaging in bulk frozen comestibles or the like filed concurrently herewith, I have described an improvement to the method of my above-identified patent wherein cartons having a predetermined size and contour which are aliquants of a carton of larger selected or predetermined size and contour are used.

The cartons which these methods contemplate using are of abnormal size, having, for example, a capacity of one, two or four gallons, this capacity being much greater than the usual pint and quart cartons hitherto used for individual servings of ice cream. They are preferably rectangular in shape, in contrast to the round metal containers heretofore used in packaging bulk ice cream, whereby there is obtained a great economy of storage space in the conventional refrigerated dispensing cabinet used in stores, soda fountains and similar places where ice cream is dispensed from bulk containers.

The cartons employed in the foregoing methods of packaging frozen or congealed comestibles are formed from relatively thin cardboard or hard surface paper which is linerless. For economy, they are shipped in flat and completely knocked-down form, to be set up in the plant where they are to be used with my novel methods. Such cartons, as pointed out, have a predetermined size and contour which must be substantially maintained in order that the packaged cartons may be used in the dispensing receptacles such as described in my co-pending application Serial No. 319,824 for a Dispensing storage receptacle for bulk ice cream distortable carton filed concurrently herewith.

A rectangular carton, of the size and dimensions contemplated and necessary for bulk service, which is made of paperboard or the like of the type contemplated, does not have sufficient inherent rigidity to be self-supporting against the fluid and freezing pressure and the weight of soft ice cream, or other such comestible, with which it is filled.

This application, therefore, concerns itself with the provision of a receptacle which will receive and support a non-rigid distortable carton used in the packaging of ice cream or the like by my above-referred-to methods and perfectly maintain the predetermined size and contour of the carton while it is being filled and hardened, thereby making the thus packaged bulk ice cream carton usable in the dispensing storage cabinet receptacle contemplated by my above-identified application for a Dispensing storage receptacle for bulk ice cream distortable carton.

The invention still further contemplates the provision of such a receptacle which has a plurality of partitions therein, each of said partitions forming a plurality of compartments in the receptacle and each compartment having a predetermined size and contour.

The invention still further contemplates the provision of such a receptacle in which the partitions are adjustable or removable therein and means for retaining said partitions in adjusted position so as to provide compartments of a predetermined contour and size which are aliquants of a unit multiple selected size and contour compartment.

The invention still further contemplates the provision of a receptacle adapted to receive and support therein non-rigid, distortable cartons of a predetermined contour filled with a comestible which expands upon subjection to a freezing or congealing process whereby said cartons will retain their predetermined contour and size during the freezing or congealing operation.

The invention further contemplates the provision of a receptacle adapted to receive and support therein non-rigid, distortable cartons of a predetermined contour and size filled with a comestible which expands upon subjection to freezing temperatures whereby said cartons will retain their predetermined contour and size during the freezing process and will be thereafter readily ejectable from such receptacle without abrading or damaging the carton side walls.

The invention still further contemplates the provision of a receptacle which will receive and support such a non-rigid distortable carton while the contents thereof are frozen and simultaneously present substantially the entire surface of the cartons directly to the freezing air.

The invention still further contemplates the provision of a receptacle which will adequately seal the junction portions of a "set up" paper carton filled with a semi-liquid, to be frozen comestible, during the filling and freezing process.

Other and further uses and objects of the invention will be apparent from the following specification and the drawings, in which Fig. 1 is a perspective view of two of my receptacles stacked one upon the other and showing cartons arranged in the compartments thereof.

Fig. 2 is a perspective view of the non-rigid carton used with my receptacle.

Fig. 3 is a fragmentary sectional view of a receptacle spacing collar.

Fig. 4 is a plan view of my receptacle, showing a carton arranged in one of the compartments thereof.

Fig. 5 is an elevational view of the receptacle of Fig. 4.

Fig. 6 is a section taken along the line 6—6 of Fig. 4.

Fig. 7 is a view taken along the line 7—7 of Fig. 4.

Fig. 8 is a section taken along the line 8—8 of Fig. 6.

Fig. 9 is a fragmentary perspective view of the stationary center partition and a removable partition arranged adjacent thereto.

The receptacle of the present invention is particularly adapted, as pointed out, for use in carrying out the process described in my Patent No. 2,109,102 issued to me February 22, 1938, and the process described in my co-pending application Serial No. 319,822 for Method of packaging in bulk frozen comestibles or the like filed concurrently herewith. According to the method described in this patent and application, bulk ice cream and similar comestibles are packaged in cartons 10 of large capacity, such as from one gallon or more, which may be assembled from a flat and completely knocked-down flat form of linerless thin paper into the container illustrated in Fig. 2. Such flat paper form may be provided with suitable flaps 12 on the edges of certain faces which flaps may cooperate with suitably arranged corresponding slots to hold the carton together in assembled form.

The carton, the use of which is contemplated, is, therefore, so thin that, as pointed out, it is not itself sufficiently rigid to be self-supporting against the fluid and freezing pressure and the weight of the soft ice cream which is to be packed in it. To make a rectangular carton in which it is contemplated to package ice cream and the like by my methods which would be sufficiently strong and rigid to maintain its shape against this pressure would require the use of such heavy material that it would be commercially impractical for single service. These cartons are, therefore, collapsible as distinguished from formed cartons which are paper-lined and thereby reenforced and rigid and self-supporting. In addition, since these cartons are used to package ice cream or other comestibles which is to be removed therefrom in small portions, for example, for individual servings, lined containers would not be satisfactory because of the possibility that the linings thereof would be torn and removed in small pieces with the portions of ice cream or comestibles served.

When, as pointed out, such large cartons are filled with semi-liquid ice cream or other fluid substances, the walls of the cartons tend to bulge out and the carton becomes distorted and there is attendant possibility of leakage past the junction parts 14. It is, therefore, necessary during the filling operation to support the side walls of the carton in order to retain the initial size and contour thereof.

After cartons of the selected size are assembled, a proper number of them are arranged in a receptacle 16, ready for filling with the semi-liquid or semi-frozen comestible by any suitable means as the spout 19.

In order to provide the required support rigidity, the receptacle concerned with herein is constructed of rigid metal rods, bars and the like. Referring particularly to Figs. 1, 4 and 5, the receptacle is constructed of a lower frame member 18 and upper frame member 20 which are formed from suitable wire, of size and strength to withstand the pressures to which it will be subjected under my methods of packaging, and which wire is bent into rectangular shape. These upper and lower frame members 18 and 20 are retained in spaced relation by means of a plurality of spaced vertical rigid rod members 22 of suitable size and strength. An intermediate frame member 24 is preferably provided to strengthen the rod members 22 against possible distortion. These rod members 22 may be affixed to the frame members at their contacting portions by any suitable means, such as welding or soldering. The rod members are placed within the interior of the frame members, thereby forming foraminous continuous walls of the receptacle. Spaced horizontal supporting bars or cross members 26, of suitable size and strength are affixed to the lower frame member to provide the foraminous bottom wall of the receptacle rigid enough to support the filled cartons.

It will be understood that the vertical rods 22 and the horizontal support members 26 are spaced as far apart as is conducive to supporting the walls of the carton against distortion under the pressures to which it is subjected with my packaging methods.

The receptacle is preferably provided with two larger compartments A of a selected size and predetermined contour and designed to retain and support two cartons of complemental size and contour, for example each of four-gallon capacity. There is, therefore, provided an intermediate fixed partition 32 having horizontal cross or strut members 34, the ends of which are secured to an adjacent frame member. The fixed intermediate partition member, therefore, comprises three spaced strut members 34 affixed at their ends to the three rectangular frame members of the receptacle. Spaced continuous closed vertical wires 36 are arranged about and enclosing the strut members to form the vertical end walls of the adjacent compartments 24 and 26.

It will at once be apparent that I have provided in the receptacle two compartments which are designed to be of a predetermined size and contour so that the cavity thereof will snugly receive a carton of the larger or multiple unit predetermined selected size and contour; for example, one of four-gallon capacity.

It will at once be apparent that the vertical rods 22, horizontal supporting bars 26 and the vertical wires 36 of the fixed partition 32 together serve to form the rigid foraminous walls of the compartments A, which are thereby provided with a selected size and predetermined contour. These compartments receive the cartons of complemental size and contour and support the walls thereof against distortion and rupture as the carton is filled with the semi-liquid or semi-frozen or semi-congealed comestible.

As pointed out in my co-pending method application filed concurrently herewith, cartons having a predetermined size and contour which are aliquants of a carton of a larger selected or predetermined size and contour are used.

It is, therefore, desired to provide movable partitions 38 which are similar in construction to the fixed partition 32, except strut members 40 are not fixedly secured to the three rectangular frame members. The ends of the upper and lower strut members 40 are bent to form hook-like portions 42 and 44 which engage the notch-like portions 46 and 48 arranged in the upper and lower rectangular frame members 20 and 18. Such notches are arranged on these frame members intermediately each compartment A so that when a movable partition 38 is arranged thereon, each compartment A may be divided into two compartments B which are each aliquot parts of the larger compartment, each compartment having a predetermined size and contour and each of which may receive a carton of complemental size and contour, i. e. two-gallon capacity. Vertical wires 50 are arranged about to enclose the strut members 40 to complete the movable partitions 38, which are made similar in form to the fixed partition 32. The vertical wires 50 of each removable partition serves as a vertical wall of the adjacent aliquot compartments 54 and 56. The cooperating bent portions 42 and 44 of the strut members 40 and the notch portions 46 and 48 of the rectangular frame members serve as a means to lock the removable partition in place.

When it is desired to use the multiple unit capacity of the receptacle compartment, the removable partition may be lifted out of the receptacle and arranged in auxiliary notches 52 and 54 which may be suitably provided in the rectangular frame members adjacent the fixed partition 32, or, if desired, such notches 56 and 58 may be arranged adjacent an end wall 60 of the receptacle. By thus providing means for retaining in the compartment a removable partition, the predetermined size and contour relationship of the larger or multiple unit to the small or aliquot units is retained.

There is, therefore, provided with the described construction a receptacle adapted to have either two or four compartments of a predetermined contour, each of which two or four compartments is of the same dimensions and contour, each of these compartments adapted to receive a carton of complemental contour and size.

The height of the receptacle is preferably such that the top of a carton 10 will project slightly above the upper rectangular frame member 20 so that the cover 62 of the carton may be arranged thereon after it is filled with ice cream.

After the cartons in the receptacle have been filled, the receptacles, with the filled cartons, are removed to the freezing room and subjected to freezing conditions to harden the comestible.

It will at once be recognized that the pressure of the liquid will force the carton walls against the foraminous receptacle walls so that the compartments will snugly hold the cartons.

As the comestible expands upon freezing, the compartment walls not only prevent possible destruction of the carton but serve to maintain substantially unchanged its size and contour.

In order to effect a greater storage capacity within the freezing room, the receptacles with the filled cartons are stacked or superposed upon each other. For example, paper ice cream containers or cartons, even if formed of relatively heavy paper, if they are stacked one upon the other in the freezing room, while the product is soft, have a comparatively low crush limit. Therefore, the number of paper cartons which can be stacked one upon the other is definitely limited, thereby effectively decreasing the storage capacity of the hardening room. The danger of crushing such cartons arranged in my receptacle is, of course, non-existent as the receptacles rest one upon the other and no stress or weight is placed upon the carton itself.

The strength of the receptacles, therefore, is such that they may be stacked upon each other in the hardening room to almost any desired height. In order to provide means for stacking one receptacle upon the other, vertical corner rods strong enough to support any desired number of filled stacked or superposed receptacles are provided. The upper ends of the corner rods 64 extend beyond the upper frame member 26 and are designed to receive the elongated recess 66 of the spacing collar or support lug 68. The lower portion of each corner rod 64 extends slightly beyond the lower frame member 18 and has secured to it the spacing collar 68. It will be apparent that by means of these spacing collars receptacles may be stacked or superimposed upon one another to any desired height.

These spacing collars are of sufficient length to extend beyond the tops of the filled cartons to space them from each other to permit circulation of the freezing air about the top and bottom of the cartons.

It will be noted that since the receptacles are constructed of spaced rod members they are thereby provided with foraminous side and bottom walls. The partitions similarly are foraminous in construction. Circulation of air about each of the cartons supported within the individual compartment is thereby assured. This feature is particularly advantageous when ice cream is being frozen within the cartons contained in the receptacle. Circulation of cold air is assured around each of the cartons in stacked relation. The corner collars on the receptacles space the bottom of the cartons from the adjacent tops thereof so that cold air will be circulated therepast.

By constructing the walls of the compartments of vertical rods or wires, the cartons may be removed from the compartments after the ice cream has been frozen without danger of abrasion to the wall surfaces of the carton. To further facilitate such removal, it is preferred to slightly taper the walls of the receptacles upwardly from the bottom wall. Such taper may be provided by making the diameter of the wire forming the lower frame member 18 proportionately slightly larger than the diameter of the wire forming the intermediate and upper frame members 24 and 20. The fixed and movable partitions 32 and 38 are correspondingly constructed so that their walls taper slightly outwardly from the lower wall. A taper outwardly of each wall of $\frac{1}{16}$ to $\frac{1}{8}$ of an inch in a length of nine inches is preferred.

Since the bottom wall of the compartment is thereby made somewhat smaller in area than the opening to the compartment, the bottom wall of an empty carton placed therein is pinched somewhat. This serves to provide a seal to the junction parts of the carton, which is enhanced when the carton is filled with the semi-liquid or semi-frozen comestible.

It will also be recognized that the receptacle concerned with herein is adapted not only for supporting the cartons during the filling and freezing operations but also for supporting the cartons during storage thereof. The receptacle may also serve for conveying the cartons from the ice cream factory to the retail stores where they may be placed in the dispensing storage receptacles for bulk ice cream distortable cartons, contemplated by my co-pending application filed concurrently herewith.

It will be further apparent that the receptacles concerned herewith are extremely light in weight yet rigid and comparatively inexpensive.

It is to be understood that numerous modifications and changes may be made in the construction of the receptacle as herein disclosed and it is intended to include such changes within the scope of the appended claims as the prior art permits.

I claim:

1. A receptacle for receiving and supporting therein a linerless paper carton, of insufficient inherent rigidity to be self-supporting, during the process of filling said carton with a fluid or semi-liquid comestible and the further process of freezing, hardening or congealing said comestible, said carton having a selected size and predetermined contour, said receptacle comprising a bottom wall and side walls extending upwardly from the bottom wall to form a compartment for receiving a said carton, said compartment of size and contour complemental to that of a said carton to snugly receive therein a said carton, said walls comprising spaced apart wires, the wires comprising the side walls, extending in an upward direction from the said bottom wall, the wires comprising the bottom and side walls being spaced only so far apart as to provide sufficient rigidity of support to a said carton.

2. A receptacle for receiving and supporting therein a linerless paper carton, of insufficient inherent rigidity to be self-supporting, during the process of filling said carton with a fluid or semi-liquid comestible and the further process of freezing, hardening or congealing said comestible, said carton having a selected size and predetermined contour, said receptacle comprising a bottom wall and side walls extending upwardly and slightly outwardly from the bottom wall to form a compartment for receiving a said carton, said compartment of size and contour complemental to that of a said carton to snugly receive therein a said carton, said walls comprising spaced apart wires, the wires comprising the side walls extending in an upward direction from the said bottom wall, the wires comprising the bottom and side walls being spaced only so far apart as to provide sufficient rigidity of support to a said carton.

3. A receptacle for receiving and supporting therein a linerless paper carton, of insufficient inherent rigidity to be self-supporting, during the process of filling said carton with a fluid or semi-liquid comestible and the further process of freezing, hardening or congealing said comestible, said carton having a selected size and predetermined contour, said receptacle comprising a bottom wall and side walls extending upwardly from the bottom wall to form a compartment for receiving a said carton, said compartment of size and contour complemental to that of a said carton to snugly receive therein a said carton, said walls comprising spaced apart wires, the wires comprising the side walls extending in an upward direction from the said bottom wall, the bottom and side walls fitting against adjacent walls of a said carton received in the receptacle, the wires comprising the bottom and side walls being spaced only so far apart as to provide sufficient rigidity of support to a said carton.

4. A receptacle for receiving and supporting therein a linerless paper carton, of insufficient inherent rigidity to be self-supporting, during the process of filling said carton with a fluid or semi-liquid comestible and the further process of freezing, hardening, or congealing said comestible, said carton having a selected size and predetermined contour, said receptacle comprising a bottom wall and side walls extending upwardly and slightly outwardly from the bottom wall to form a compartment for receiving a said carton, said compartment of size and contour complemental to that of a said carton to snugly receive therein a said carton, said walls comprising spaced apart wires, the wires comprising the side walls extending in an upward direction from the said bottom wall, the bottom and side walls fitting against adjacent walls of a said carton received in the receptacle, the wires comprising the bottom and side walls being spaced only so far apart as to provide sufficient rigidity of support to a said carton received in the receptacle.

5. A receptacle for receiving and supporting therein a linerless paper carton, of insufficient inherent rigidity to be self-supporting, during the process of filling said carton with a fluid or semi-liquid comestible and the further process of freezing, hardening or congealing said comestible, said carton having a selected size and predetermined contour, said receptacle comprising a bottom wall and side walls extending upwardly from the bottom wall to form a compartment for receiving a said carton, said compartment of size and contour complemental to that of a said carton to snugly receive therein a said carton, said walls being foraminous and fitting against adjacent walls of a said carton received in the receptacle, the elements comprising said foraminous walls being of strength sufficient and spaced only so far apart as to provide the necessary rigidity of support to a said carton.

6. A receptacle for receiving and supporting therein a linerless paper carton, of insufficient inherent rigidity to be self-supporting, during the process of filling said carton with fluid or semi-liquid ice cream and the further process of freezing, hardening or congealing said ice cream, said carton having a selected size and rectangular in shape, said receptacle comprising a bottom wall and side walls extending upwardly from the bottom wall to form a compartment for receiving a said carton, said compartment of size and shape complemental to that of a said carton to snugly receive therein a said carton, said walls comprising spaced apart wires, the wires comprising the side walls, extending in an upward direction from the said bottom wall, the wires comprising the bottom and side walls being spaced only so far apart as to provide sufficient rigidity of support to a said carton.

7. A receptacle for receiving and supporting therein a linerless paper carton, of insufficient inherent rigidity to be self-supporting, during the process of filling said carton with fluid or semi-liquid ice cream and the further process of freezing, hardening or congealing said ice cream, said carton having a selected size and rectangular in shape, said receptacle comprising a bottom wall and side walls extending upwardly and slightly outwardly from the bottom wall to form a compartment for receiving a said carton, said compartment of size and shape complemental to that of a said carton to snugly receive therein a said carton, said walls comprising spaced apart wires, the wires, comprising the side walls, extending in an upward direction from the said bottom wall, the wires comprising the bottom and side walls being spaced only so far apart as to provide sufficient rigidity of support to a said carton.

8. A receptacle for receiving and supporting therein a linerless paper carton, of insufficient inherent rigidity to be self-supporting, during the process of filling said carton with fluid or semi-liquid ice cream and the further process of freezing, hardening or congealing said ice cream, said carton having a selected size and rectangular shape, said receptacle comprising a bottom wall and side walls extending upwardly from the bottom wall to form a compartment for receiving a said carton, said compartment of size and shape complemental to that of a said carton to snugly receive therein a said carton, said walls comprising spaced apart wires, the wires, comprising the side walls, extending in an upward direction from the said bottom wall, the bottom and side walls fitting against adjacent walls of a said carton received in the receptacle, the wires comprising the bottom and side walls being spaced only so far apart as to provide sufficient rigidity of support to a said carton.

9. A receptacle for receiving and supporting therein a linerless paper carton, of insufficient inherent rigidity to be self-supporting, during the process of filling said carton with fluid or semi-liquid ice cream and the further process of freezing, hardening or congealing said ice cream, said carton having a selected size and rectangular shape, said receptacle comprising a bottom wall and side walls extending upwardly and slightly outwardly from the bottom wall to form a compartment for receiving a said carton, said compartment of size and contour complemental to that of a said carton to snugly receive therein a said carton, said walls comprising spaced apart wires, the wires comprising the side walls extending in an upward direction from the said bottom wall, the bottom and side walls fitting against adjacent walls of a said carton received in the receptacle, the wires comprising the bottom and side walls being spaced only so far apart as to provide sufficient rigidity of support to a said carton.

10. A receptacle for receiving and supporting therein a linerless paper carton, of insufficient inherent rigidity to be self-supporting, during the process of filling said carton with a fluid or semi-liquid comestible and the further process of freezing, hardening or congealing said comestible, said carton having a selected size and predetermined contour, said receptacle comprising a bottom wall, opposed side walls, and opposed end walls, a central partition wall fixedly secured to the side walls intermediate the end walls to form a pair of adjacent compartments each for receiving a said carton, each of said compartments of size and contour complemental to that of a said carton to snugly receive a said carton therein, said walls and central partition comprising spaced apart wires, the wires comprising the side walls, end walls and central partition extending in an upward direction from the said bottom wall, the wires comprising the bottom, side and end walls and the central partition being spaced only so far apart as to provide sufficient rigidity of support to said carton received in a compartment.

11. The receptacle of claim 10 and including a second partition movably arranged in a compartment and cooperating means on the second partition and the side walls to releasably lock said second partition in position in a compartment to form therein adjacent sub-compartments each having a unit size and contour which are aliquot parts of the first mentioned compartment.

12. The receptacle of claim 10 and including a second partition movably arranged in a compartment and cooperating means on the second partition and the side walls to releasably lock said second partition in position in a compartment to form therein adjacent sub-compartments each having a unit size and contour which are aliquot parts of the first mentioned compartment, said second partition comprising wires extending in an upward direction from the bottom wall.

13. The receptacle of claim 1 and including members arranged adjacent the underside of the receptacle, said members adapted to receive a second similar receptacle superposed on the first mentioned receptacle to space the receptacles apart.

14. A receptacle for receiving and supporting therein a linerless paper carton of insufficient inherent rigidity to be self-supporting, during the process of filling said carton with a fluid or semi-liquid comestible and further process of freezing, hardening or congealing said comestible, said carton having a selected size and predetermined contour, said receptacle comprising a bottom wall, and opposed side walls and opposed end walls extending upwardly and slightly outwardly from the bottom wall, a central partition wall fixedly secured to the side walls intermediate the end walls to form a pair of adjacent compartments, each face of the central partition forming an end wall of an adjacent compartment, each face of the central partition extending upwardly from and at a slight inclination to the bottom wall and to each other, each of said compartments of size and contour complemental to that of a said carton to snugly receive a said carton therein, said walls and central partition comprising spaced apart wires, the wires comprising the side walls and central partition extending in an upward direction from the said bottom wall, the wires comprising the bottom, side and end walls and the central partition being spaced only so far as to provide sufficient rigidity of support to a said carton received in a compartment.

15. The receptacle of claim 14 and including a second partition movably arranged in a compartment and cooperating means on the second partition and the side walls to releasably lock said second partition in position in the compartment to form therein adjacent sub-compartments, each face of said second partition forming an end wall of an adjacent sub-compartment, each face of said second compartment extending upwardly from and at a slight inclination to the bottom wall and to each other, each sub-compartment having a unit size and contour which are aliquot parts of the first mentioned compartment.

16. The receptacle of claim 14 and including a second partition movably arranged in a compartment and cooperating means on the second partition and the side walls to releasably lock said second partition in position in the compartment to form therein adjacent sub-compartments, each face of said second partition forming an end wall of an adjacent sub-compartment, each face of said second compartment extending upwardly from and at a slight inclination to the bottom wall and to each other, each sub-compartment having a unit size and contour which are aliquot parts of the first mentioned compartment, said second partition comprising wires extending in an upward direction from the bottom wall.

GEORGE W. COCKS.